United States Patent [19]

Stinson

[11] Patent Number: 5,135,340
[45] Date of Patent: Aug. 4, 1992

[54] BULGED AND SWELLED BLIND FASTENER

[75] Inventor: Dennis D. Stinson, Whittier, Calif.

[73] Assignee: Hi-Shear Corporation, Torrance, Calif.

[21] Appl. No.: 685,082

[22] Filed: Apr. 10, 1991

[51] Int. Cl.$^5$ .................... F16B 13/04; F16B 37/04
[52] U.S. Cl. ................................ 411/34; 411/38; 411/43; 411/183
[58] Field of Search ..................... 411/34–38, 411/43, 55, 173, 177, 180, 181, 183, 280, 281, 32, 33, 49

[56] References Cited

U.S. PATENT DOCUMENTS

| | | | |
|---|---|---|---|
| 2,959,999 | 11/1960 | Wing | 411/49 |
| 3,236,143 | 2/1966 | Wing | 411/34 |
| 3,651,563 | 3/1972 | Volkmann | 411/32 |
| 3,698,278 | 10/1972 | Trembley | 411/34 |
| 3,747,656 | 7/1973 | Mortus | 411/281 |

FOREIGN PATENT DOCUMENTS

| | | | |
|---|---|---|---|
| 1522481 | 3/1968 | France | 411/55 |
| 344832 | 4/1960 | Switzerland | 411/55 |

Primary Examiner—Neill R. Wilson
Attorney, Agent, or Firm—Donald D. Mon

[57] ABSTRACT

A fastener for blind installation where only one side of a workpiece is accessible for installation of the fastener. The fastener utilizes two methods of deformation on its blind side. The fastener has a tubular body made of a ductile material with a head at one end. A separate expander nut is made of a harder material and adapted with internal screw threads. The expander is engaged by a threaded pulling mandrel attached which protrudes through the tubular fastener to be installed. The pulling mandrel engages the expander by means of the screw thread and pulls it onto the tubular sleeve which then fails in columnar buckling to form a substantial bulge and foot print on the blind side of the workpiece. The expander is then pulled at increased pressure to bulge the protruding portion of the tubular fastener above the undulation formed by the buckling of the tubular body to give a secondary source of tensile resistance under load by seating the bulged portion of the tubular body on the undulation to reinforce the foot print of the buckled column.

The mandrel is removed by unthreading and a threaded bolt is then screwed into the expander through the tubular body to provide further structural integrity to the installed blind fastener.

5 Claims, 2 Drawing Sheets

BULGED AND SWELLED BLIND FASTENER

FIELD OF THE INVENTION

A fastener for assembly of a multi-part structure from one accessible side by use of a pulling mandrel engaging an expander to deform the blind side of the fastener.

BRIEF DESCRIPTION OF THE INVENTION

The present invention uses a combination of two well-known devices in the prior art to produce an improved blind fastener of high reliability and strength. The particular manner is to use a hardened mandrel to protrude through a tubular sleeve to engage expander means and upset a tubular body on the inaccessible or blind side. This can be accomplished in several ways.

In U.S. Pat. No. 3,236,143, a mandrel engages internal threads in a tubular sleeve to pull that tubular sleeve until an elongated portion which protrudes from a workpiece on an inaccessible side fails in column buckling to produce toroidal-like undulations along the tubular member. Such undulations form a contact surface called a foot print against the workpiece. One or more such undulations may be formed depending on the length of tubular protrusion selected. The more common blind fasteners use only one undulation on the blind side. U.S. Pat. No. 3,236,143 hereby incorporated into this application in its entirety for its shown of a fastener having these features.

In U.S. Pat. No. 2,959,999 an expander having internal screw threads of high strength is engaged with an installation mandrel to pull the expander into the tubular body of the blind fastener to form a bulb workpiece assembly and a bolt may be installed through the tubular sleeve to complete the assembly, U.S. Pat. No. 2,959,999 is hereby incorporated into this application in its entirety for its showing of a fastener with this feature.

U.S. Pat. No. 3,369,442 being similar in function to U.S. Pat. No. 3,236,143 is also incorporated into this application in its entirety for its showing of a collapsible tubing.

An object of this invention is to provide a blind fastener having a toroidal-like undulation formed on its blind side to provide a flat enlarged foot print for use on softer or crushable materials and to form a bulge above and in contact with the toroidal-like undulation generated on the tubular body of the blind fastener to provide increased strength to the blind side of the fastener.

A further object of the invention is to provide for high strength screw threads to engage a high strength core bolt to increase the strength of the final assembly of the blind fastener in a structural joint.

A further object of the invention is to provide for locking a core bolt into an expander in a blind fastener to prevent loss of the core bolt and subsequent loss of strength from the blind fastener assembly.

The foregoing and other features and advantages will be fully understood from the following detailed description and the accompanying drawings, in which:

DESCRIPTION OF THE INVENTION

Figure 1:
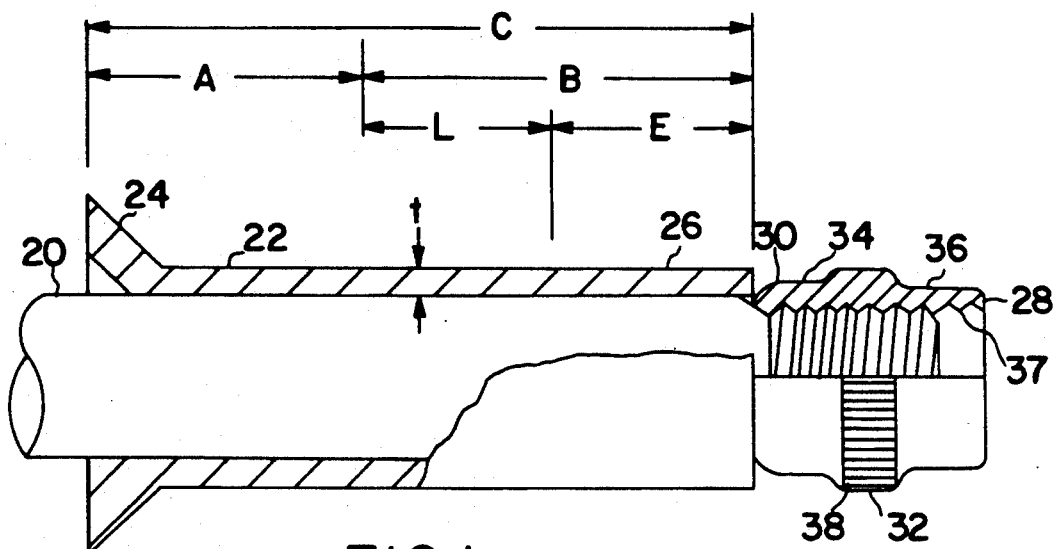
FIG. 1 is an elevation, partly in cross-section of an unset fastener according to the invention.

An embodiment to the invention shown in FIG. 1 is installed on a pulling mandrel 20. A tubular body 22 has a head 24 and a shank 26. An expander 28 is threadably engaged with mandrel 20. The expander 28 has a rounded nose portion 30 and a shoulder 32 which is cylindrical and of greater diameter than cylindrical surfaces 34 and 36. The cylindrical surface 32 has straight axial knurling 38.

All of the device thus described is shown in U.S. Pat. No. 2,959,999. However, in the present invention the length of the sleeve is the sum of its desired grip capability (A) of the fastener assembly and the upset length (B). The upset length (B) must allow for the tubular collapse of the tubular body 22 before the action of bulging the tubular body 22 is performed by the internal sliding engagement with the expander 28 into the tubular body 22 for approximately the length (E).

The columnar failure of the tubular shank 26 depends upon its upset (free) length (B) and, its wall thickness (+). The table in U.S. Pat. No. 3,236,143 in column 10 gives nominal dimensions for a device to create two successive undulations in upset, but by modifying the length of the unconfined tubular shank then only one undulation can be formed.

Figure 2:
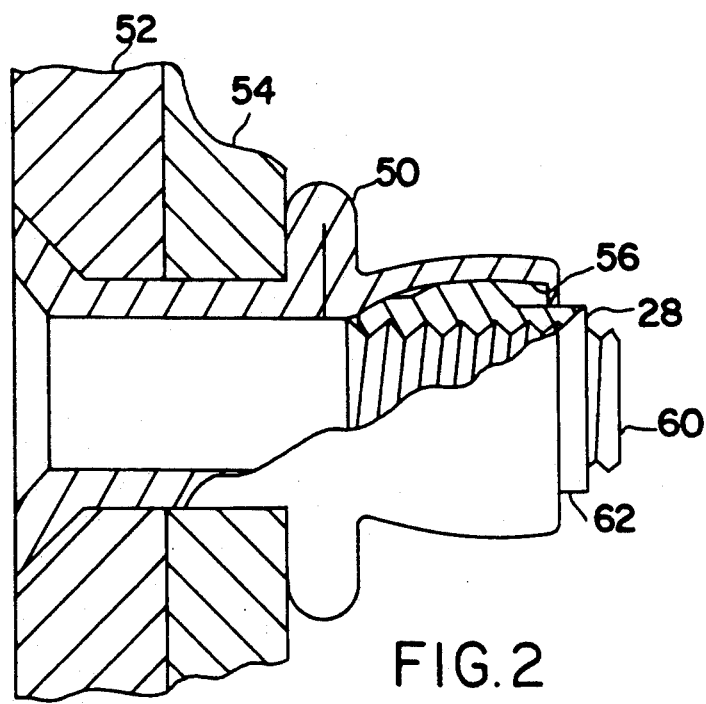
FIG. 2 is an elevation partly in cross-section of a set blind fastener in assembly of the type shown in FIG. 1.

In FIG. 1, (A) is the length of grip for expected use of the fastener, (B) is the protruding length of the tubular shank 26 of the fastener 22, (L) is the unconfined length of the tubular shank 26 which is designed to fail in buckling as can be seen in FIG. 2. A bulge 64 is formed with a leading surface of revolution 66 at the expander 28 upon application of additional force with mandrel 20 after the columnar undulation 50 is formed. The ability to withstand the additional force for upset of the tubular body 26 by the expander 28 is created by the formation of the undulation 50 and its bearing upon the workpieces 52 and 54. Frictional forces cause the free, blind end 56 of tubular shank 26 to curl around expander 28 as axial knurling 38 slides into and engages shank 26, as can be seen in FIG. 2.

Figure 4:
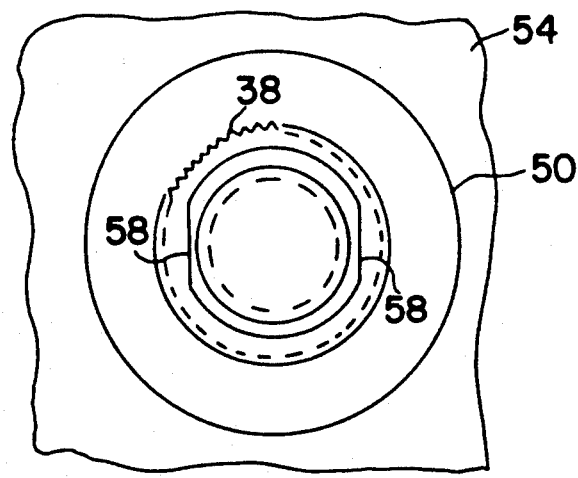
FIG. 4 is a side elevation of the embodiment of FIG. 1 in its set configuration.

The cylindrical surface 62 of the expander 28 is deformed by indentations 58 (FIG. 4) to provide for deflection by the expander's screw thread 37 for locking core bolt 60 into final assembly of the blind fastener.

Figure 3:
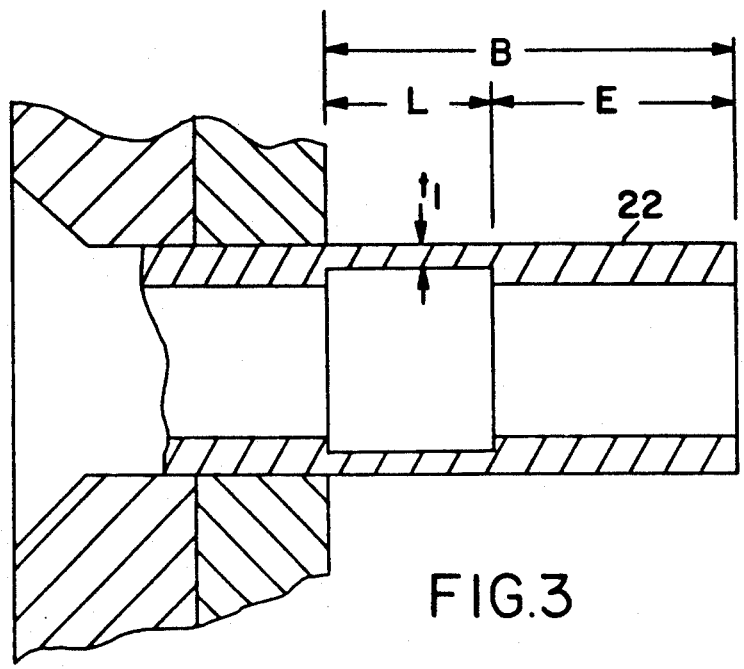
FIG. 3 is an elevation partially in cross-section of another embodiment of the invention.

FIG. 3 shows another embodiment of the invention which includes the length (L) of tubular body 22 with its tubular wall thinned to dimension (+) to provide for generation of the columnar undulation at a lower applied force to accommodate softer or crushable workpiece materials.

This invention is not limited to the embodiments described in the description and illustrated in the drawings, which are given by way of example and not of limitation, but only in accordance with the scope of the appended claims.

I claim:

1. A blind fastener adapted to fit in a hole in an assembly of objects with dual reinforcing modes of setting which comprises:

a tubular sleeve member having a central axis, said tubular sleeve having a bore therethrough, said tubular body member having a head formed at a first end and a cylindrical tubular shank extending to a second end, said shank projecting beyond said assembly of objects, said head seated on an opposite side of said assembly of objects;

an expander member, said expander member having internal threaded means to be engaged by a mandrel and drawn against the projecting shank of said tubular sleeve member, said projecting shank of said tubular sleeve member being of sufficient length and adapted to collapse in columnar failure to form a first toroidal-like undulation against said assembly of objects, continuously increasing said pulling force on said expander pulling said expander into an additional length provided on the projecting shank by flaring said shank in hoop tension, said expander forming a radial bulge around its exterior shape, said radial bulge having a leading surface of revolution, to seat against said first formed undulation.

2. A blind fastener according to claim 1 which includes said expander provided with external straight longitudinal knurls adapted to engage with the internal surface of said cylindrical tubular shank to prevent relative rotation.

3. A blind fastener according to claim 2 which includes at least one of said internal threads being physically deformed and adapted to lock externally threaded means against rotation.

4. A blind fastener according to claim 1 which includes a core bolt, said core bolt adapted to fit within said tubular body and further adapted with external threads to engage said expander means in final assembly.

5. A blind fastener according to claim 2 in which said projecting shank of said tubular sleeve member includes an additional length into which said expander member enters so that said longitudinal knurls enter said additional length so as to curl it to a reduced diameter beyond the last contact with said longitudinal knurls.

* * * * *